(12) United States Patent
Ingwall et al.

(10) Patent No.: US 6,992,805 B2
(45) Date of Patent: Jan. 31, 2006

(54) HOLOGRAPHIC FILTER WITH A WIDE ANGULAR FIELD OF VIEW AND A NARROW SPECTRAL BANDWIDTH

(75) Inventors: Richard T. Ingwall, Newton, MA (US); David A. Waldman, Concord, MA (US)

(73) Assignee: Aprilis, Inc., Maynard, MA (US)

( * ) Notice: Subject to any disclaimer, the term of this patent is extended or adjusted under 35 U.S.C. 154(b) by 71 days.

(21) Appl. No.: 10/170,007

(22) Filed: Jun. 11, 2002

(65) Prior Publication Data
US 2002/0196486 A1  Dec. 26, 2002

Related U.S. Application Data

(60) Provisional application No. 60/297,307, filed on Jun. 11, 2001.

(51) Int. Cl.
*G02B 5/32* (2006.01)
(52) U.S. Cl. .................................................. 359/15
(58) Field of Classification Search .................. 359/15, 359/22, 24, 559–569, 615
See application file for complete search history.

(56) References Cited

U.S. PATENT DOCUMENTS

| | | | |
|---|---|---|---|
| 4,094,011 A | | 6/1978 | Nagao |
| 4,842,396 A | * | 6/1989 | Minoura et al. ............ 359/212 |
| 4,946,245 A | * | 8/1990 | Chamberlin et al. .......... 385/37 |
| 5,481,523 A | | 1/1996 | Dewald |
| 5,519,517 A | | 5/1996 | Redfield et al. |
| 5,530,565 A | * | 6/1996 | Owen .......................... 359/15 |
| 5,877,874 A | | 3/1999 | Rosenberg |
| 6,023,709 A | | 2/2000 | Anglin et al. |
| 6,127,066 A | | 10/2000 | Ueda et al. |
| 6,199,146 B1 | | 3/2001 | Pence |
| 6,212,148 B1 | | 4/2001 | Hesselink et al. |
| 6,348,983 B1 | * | 2/2002 | Curtis et al. ................ 359/3 |
| 6,538,775 B1 | * | 3/2003 | Bowley et al. .............. 359/3 |

FOREIGN PATENT DOCUMENTS

| | | |
|---|---|---|
| DE | 4411321 A1 | 10/1995 |
| EP | 0821293 A2 | 1/1998 |
| WO | WO 00/72057 A1 | 11/2000 |

OTHER PUBLICATIONS

Kogelnik, Herwig, "Coupled Wave Theory for Thick Hologram Gratings," *The Bell System Technical Journal*, 48 (9) :2909-2947 (1969).
Orlov, Sergei S., "Volume Holographic Data Storage," *Communications of the ACM*,43(11) :46-54 (2000).
Barbastathis, G. et al., "Volume Holographic Multiplexing Methods," *Library of Congress Cataloging-in-Publication Data*, pp. 21-62.

* cited by examiner

*Primary Examiner*—Mark A. Robinson
*Assistant Examiner*—Alessandro Amari
(74) *Attorney, Agent, or Firm*—Hamilton, Brook, Smith & Reynolds, P.C.

(57) ABSTRACT

A holographic optical filter that includes an optical recording medium for storing several multiplexed reflection holograms that are formed by successive interference between two or more collimated object beams with a common collimated reference beam. The object beams are incident to the recording material at a series of angles chosen to provide reflection efficiency over the desired filed of view at the specified wavelength.

14 Claims, 3 Drawing Sheets

HOLOGRAPHIC FILTER WITH A WIDE ANGULAR FIELD OF VIEW AND A NARROW SPECTRAL BANDWIDTH

RELATED APPLICATION

This application claims the benefit of U.S. Provisional Application No. 60/297,307, filed Jun. 11, 2001, the entire contents of which are incorporated herein by reference.

BACKGROUND

Bragg gratings are structures with a periodic variation in the refractive index that are usually formed in optical components such as holograms, waveguides, and optical fibers. These structures reflect a narrow spectral and angular bandwidth of light that is determined by the average refractive index of the grating, and the spatial period of the refractive index variation.

The fraction of incident light that is reflected Bragg gratings is determined by the magnitude of the refractive index variation and by the number of refractive index periods included in the structure. Reflectivity greater than 99% can be obtained in Bragg structures that are only 100 $\mu$m to 300 $\mu$m thickness or optical path length and have refractive index changes near 0.002. Accordingly, the spectral bandwidth required by a particular application is accounted for the appropriate choice of hologram thickness, or in the case of waveguides by the optical path length. The spectral bandwidth of the reflected light decreases as the number of refractive index periods increases. Accordingly the spectral bandwidth required by a particular application is easily accounted for by appropriate choice of hologram thickness. A 300 $\mu$m thick Bragg grating, for example, with a reflectivity at 500 nm that is greater than 99%, will have a spectral bandwidth that is less than 0.4 nm, full width half maximum (FWHM). This combination of high reflectivity over narrow spectral bandwidth has several interesting applications. Bragg reflection gratings, for example, are used in optical communication as stabilizers for pump lasers, narrowband wavelength division multiplexing (WDM) add/drop filters, and gain-flattening filters. Additional applications include narrowband filters for laser protection, Raman spectroscopy, wireless optical communication, and light detection and ranging systems (LIDAR). In these applications a signal is carried by light of a specific wavelength. It is, therefore, often necessary in such devices to improve their signal-to-noise ratio (SNR) by isolating the signal beam wavelength from polychromatic background light.

Typical uses of airborne LIDAR systems include the detection of submarines and mines, environmental monitoring, and bottom mapping. The signal to noise of LIDAR systems is inversely proportional to the line width of the filter employed, and is directly proportional to the level of detection of the desired wavelength.

Two related problems can limit the direct use of a single, narrow-spectral-bandwidth, reflection hologram to select the desired signal beam. First, reflection of light outside the desired spectral bandwidth can be achieved by changing its incident angle to match the desired Bragg condition of the hologram. However, if this off-wavelength reflected light is allowed to reach the detector of any device employing a holographic filter, the SNR will be reduced. In addition, signal light that is incident outside of a relatively narrow band of incident angles will not be reflected and the detected signal strength will be less than the total signal striking the filter. Further, increasing the thickness of a reflection hologram, or, for example, the optical pathlength of a waveguide, narrows the spectral bandwidth but also reduces the angular field of view.

SUMMARY

The current invention solves these aforementioned problems by using a multiplexed reflection hologram in combination with a spatial filter to detect light signals with a narrow spectral bandwidth over an enhanced angular field of view. The device is constructed to act as a narrow-spectral bandwidth filter that is capable of selectively reflecting most of the light in a narrow spectral bandwidth from a polychromatic beam of light with a relatively large angular field of view.

In one aspect of the invention, a holographic optical filter includes an optical recording medium for storing several multiplexed reflection holograms that are formed by successive interference between two or more collimated object beams with a common collimated reference beam. The object beams are incident to the recording material at a series of angles ($\beta$ of FIG. 3A), chosen to provide reflection efficiency over the desired filed of view at the specified wavelength. The angular field of view can include either angles in a single incident plane, or a cone of incident angles.

Embodiments of this aspect can include one or more of the following features. Any light with the same wavelength as the object beams that is incident to the optical recording medium within the angular range $\beta$ is reflected in a direction parallel to the common reference beam, and any light with a wavelength different from the object beams that is incident to the optical recording medium is either transmitted or is reflected in a direction at an angle different from that of the common reference beam. The common reference beam can be a plane wave, collimated beam.

The above holographic optical element is combined with a spatial filter for selecting an optical signal of the desired wavelength that is propagating in a direction parallel to the common reference beam, and for blocking light of undesired wavelengths that is propagating in all other directions. The spatial filter can be provided with a lens that focuses the light that is reflected from the holographic optical element, and a pin hole that transmits the focused light with the desired wavelength, only if it is propagating in the desired direction, and blocks light of wavelengths that differ from the desired wavelength.

In another aspect, the invention features a method of isolating light with a narrow spectral bandwidth from light with a broad spectral bandwidth over a large angular field of view by directing a light beam with multiple wavelengths from over a large angular field of view at a multiplexed reflection hologram, and reflecting light with the desired wavelength in a direction parallel to an original reference beam. Filtering the light can include directing light reflected from the multiplexed hologram to a spatial filter.

In yet another aspect, the invention features forming a holographic filter including providing an holographic recording medium, and successively transmitting multiple object beams at the medium from one side of the medium while transmitting a common reference beam from an opposite side of the medium. Each of the multiple object beams and the reference beam forms a hologram within the holographic recording medium by interference of the respective object beam and the reference beam. The interference patterns of the multiple holograms are superimposed to form a multiplexed holographic filter.

In some embodiments, the multiple object beams are incident to the medium over a series of angles chosen to provide reflection efficiency over the desired angular field of view. The holographic recording medium can for example be made of a photopolymerizable material, photorefractive cyrstals or polymers, bleached silver halide film, or dichromated gelatin. The medium can have a thickness between about 50 μm and 5 mm depending upon the particular application of the invention.

Among other advantages, the optical filter of the present invention provides a narrow spectral bandpass filter that accepts light over an wide angular field of view without significantly reducing the signal to noise ratio. Holograms particularly useful for this application are made from photopolymerizable materials, but can also be made from photorefractive materials, photochromic materials and the like. Photopolymer holograms can be made into a variety of shapes, sizes and thickness consistent with the requirements of this application. They generally exhibit the dynamic range needed for hologram multiplexing, and furthermore the resulting holograms are environmentally stable.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
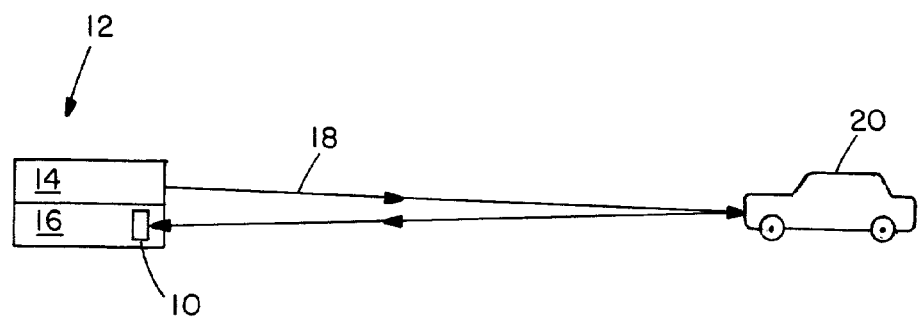
FIG. 1A is an illustration depicting a LIDAR with a receiver that includes a holographic filter in accordance with the invention.
Figure 1B:
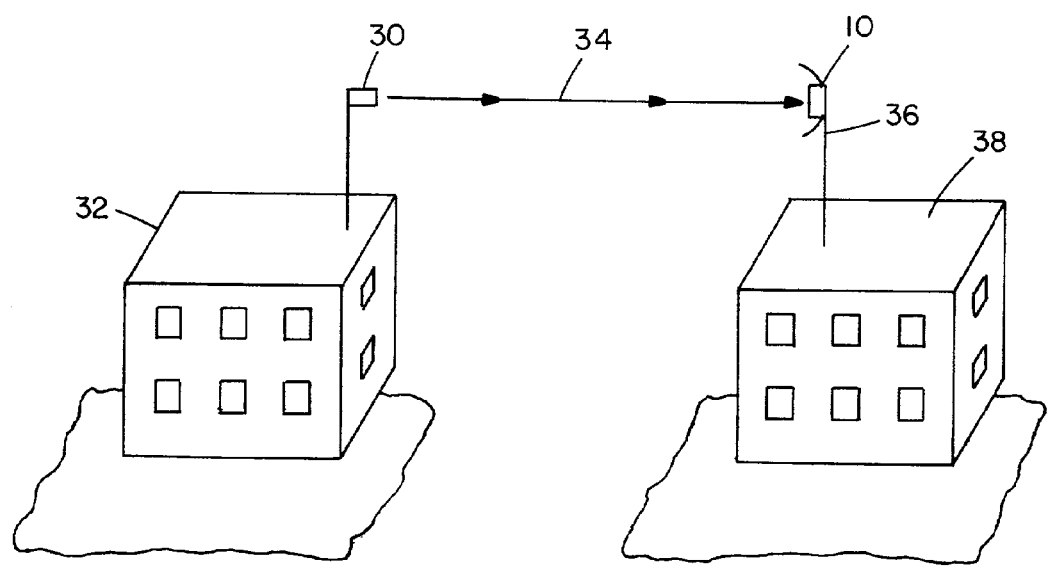
FIG. 1B is an illustration of a "last mile" fiber optics network with a receiver that includes a holographic filter in accordance with the invention.

There are shown in FIGS. 1A and 1B implementations of a holographic filter 10 in accordance with the present invention. In FIG. 1A, a light detection and ranging system (LIDAR) system 12 includes a laser source 14 and a detector or receiver 16 provided with the holographic filter 10. The laser source 14 directs a light beam 18 at an object 20, such as an automobile, airplane, or submarine, which reflects the beam back to the detector 16. In a LIDAR system used as a range finder, electronics within the LIDAR measures the time interval between when the source 14 emits the light beam 18 and the detector senses the reflected beam from the object 20. The distance between the LIDAR system 12 is then easily calculated from the product of the measured time interval and the speed of light.

In FIG. 1B, a "last mile" fiber optics network uses an optical transmitter 30 located on top of a building 32 that sends optical signals 34 to an optical detector 36 provided with the holographic filter 10 and mounted on top of another building 38. Such an arrangement can be used in optical telecommunications to communicate between buildings, for example, in a university or corporate campus.

In either of the applications shown in FIG. 1A or 1B, the holographic filter 10 of the receiver 16, or the detector 36, selects the desired signal beam of a particular wavelength from the polychromatic ambient light over a wide angular field of view.

Figure 2A:
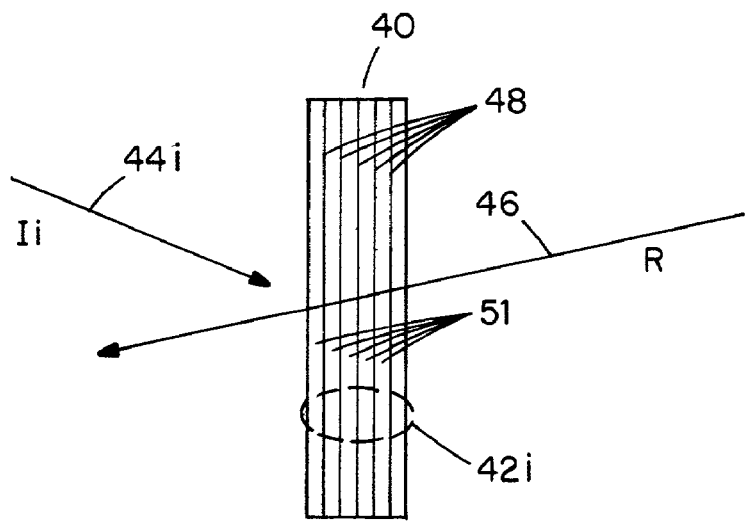
FIG. 2A is a schematic illustration showing the recording of a single reflection hologram of a holographic recording medium.
Figure 2B:
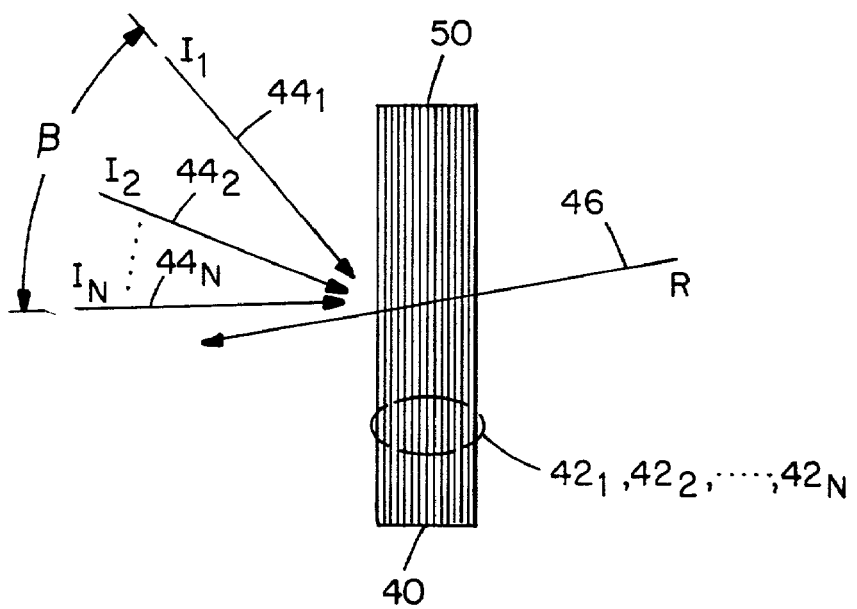
FIG. 2B is a schematic illustration showing the recording of a multiplexed reflection hologram.

Referring now to FIGS. 2A and 2B, there is shown a multiplexed reflection hologram 50 of the holographic filter 10. The multiplexed reflection hologram 50 is stored in a medium 40 formed, for example, of photopolymerizable material with a thickness between about 50 μm and 5 mm. Examples of photopolymerizable material include, but are not limited to acrylate, vinyl ether, and epoxy monomoers and/or oligomers. The medium 40 can be shaped as a disk, square, rectangle or in any other suitable geometry.

Referring in particular to FIG. 2A, a single hologram $42_i$ stored within the medium 40 is formed by a collimated object beam $44_i$, $I_i$, incident from one side of the medium 40, and a collimated reference beam 46, R, such that the reference beam 46 is coherent with the object beam 44, and is incident from the opposite side of the medium 40. (Note that i=1, 2, . . . , N identifies a particular hologram.) The object beam $44_i$ and the reference beam 46 create an interference pattern within the medium 40 which forms the hologram $42_i$ having a large number of fringes 48 with spacings 51.

Thus as shown in FIG. 2B, the multiplexed reflection hologram 50 is made of multiple holograms $42_1$, $42_2$, . . . , $42_N$, in which for each hologram $42_i$, a respective object beam $44_i$ is used in combination with the common reference beam 46. As such, the multiplexed reflection hologram 50 is made of superimposed interference patterns from the individual holograms $42_i$. The object beams are incident at a series of angles chosen to provide reflection efficiency over the desired angular field of view. For example, the multiplexed reflection hologram 50 has an angular field of view of β generated by a series of object beams $44_1$, $44_2$, . . . , $44_N$ incident with the holographic recording medium over the angle β. All of the object beams $44_1$, $44_2$, . . . , $44_N$, as well as the reference beam 46 have the same wavelength and are coherent. The angular field of view can include either angles in a single incident plane, or a cone of incident angles.

Figure 3:
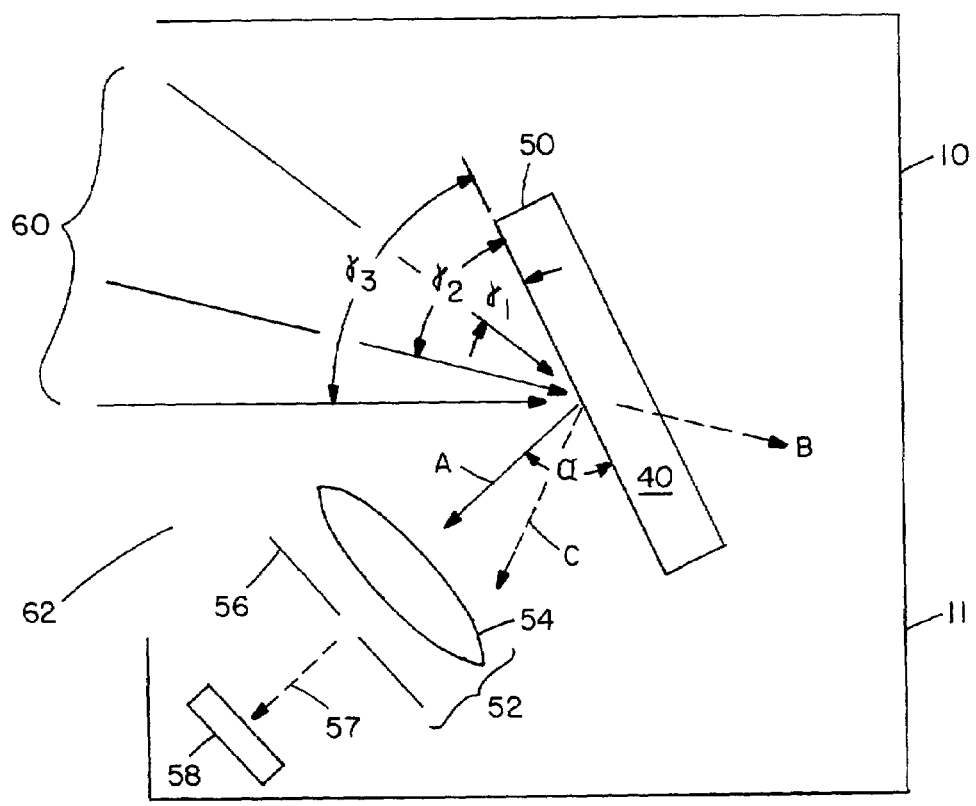
FIG. 3 is a schematic illustration of the holographic filter used in the applications shown in FIGS. 1A and 1B in accordance with the invention.

Particular details of the holographic filter 10 are shown in FIG. 3. The holographic filter 10 is provided with the multiplexed reflection hologram 50 stored in the holographic recording medium 40 is positioned within a box-like housing 11 with an opening 62. The filter 10 also includes a signal wavelength sensor 58 located a distance from the recording medium 40 and a spatial filter 52 positioned between the recording medium 40 and the wavelength sensor 58.

The spatial filter 52 may include a lens 54 and a pin hole 56, with the holographic medium located on one side of the lens 54 and the pin hole 56 located on the opposite side. The lens 54 focuses the reflected light beam from the recording medium 40 towards the pin hole 56, such that only light with a desired wavelength 57 passes through the pin hole 56 to signal wavelength sensor 58.

In the illustrated embodiment, the housing 11 has a width of about 10 cm, a length of about 10 cm, and a height of about 10 cm, and is made of a suitable material such as aluminum, and the opening 62 is about 5 cm by 5 cm. The lens 54 has a diameter of about 3 cm, and the pin hole 56 has a diameter between about 50 μm to 500 μm, allowing light with wavelengths between about 400 nm to 1700 m to pass through the pin hole 56. The sensor 58 can be a semiconductor photodiode made from silicon, germanium, or indium\gallium\arsenide or any other suitable material.

In use, incoming light 60 with multiple wavelengths is transmitted through the opening 62 of the filter 10 to the multiplexed hologram 50 in a manner that light with a desired wavelength, that is, light at the signal-beam wavelength, is incident upon the multiplexed hologram 50 over a range of angles, $\gamma_i$, where the subscript "i" identifies the particular incident light beam. Any light with the signal-beam wavelength that is incident on the multiplexed hologram, and within the range of angles accepted by the multiplexed hologram, is reflected in a common direction at an angle α from the multiplexed reflection hologram 50, as indicated by the arrow A. Light outside the desired wavelength, that is, the off-wavelength light passes through the hologram 50 in the direction, for example, of arrow B, or because of Bragg matching conditions is reflected by the hologram 50. This reflected off-wavelength light (arrow C), however, is not reflected in the direction of the signal wavelength (arrow A). Therefore, since the spatial filter 52 will only pass light of the signal wavelength that is directed in the direction of arrow A, it will block all light reflected by the hologram 50 that does not have the desired signal wavelength. Thus, combining the multiplexed hologram 50 with the spatial filter 52 in the manner described above provides a narrow spectral bandpass filter that accepts light over an enhanced angular field of view.

While this invention has been particularly shown and described with references to preferred embodiments thereof, it will be understood by those skilled in the art that various changes in form and details may be made therein without departing from the scope of the invention encompassed by the appended claims.

What is claimed is:

1. A holographic optical filter, comprising:
   an optical recording medium that stores a multiplexed reflection hologram, the hologram being formed by successive interference between two or more collimated object beams and a common collimated reference beam,
   the object beams being coherent with the common reference beam and being incident to the optical recording medium at a series of angles chosen to provide reflection efficiency over a selected angular field of view, wherein any light with the same wavelength as the object beams that is incident to the optical recording medium is reflected in a direction parallel to the common reference beam.

2. The holographic filter of claim 1, wherein any light with wavelength different from the object beams that is incident to the optical recording medium is reflected in a direction at an angle different from that of the common reference beam.

3. The holographic filter of claim 1, further comprising a filter that selects a reflected light signal of a desired wavelength and blocks reflected light of undesired wavelengths.

4. The holographic filter of claim 3, wherein the filter is a spatial filter.

5. The holographic filter of claim 4, wherein the spatial filter includes a lens that focuses the reflected light.

6. The holographic filter of claim 4, wherein the spatial filter includes a pin hole.

7. The holographic filter of claim 1, wherein the angular field of view includes angles in a single incident plane.

8. The holographic filter of claim 1, wherein the angular field of view includes a cone of incident angles.

9. A method of forming a holographic filter, comprising:
   providing an holographic recording medium; and
   transmitting two or more collimated object beams at the medium from one side of the medium while transmitting a common collimated reference beam from an opposite side of the medium in a manner in which each of the multiple object beams and the reference beam forms a hologram within the holographic recording medium by successive interference of the respective object beam and the reference beam so that the interference patterns are superimposed to form a multiplexed holographic filter, the multiplexed hologram configured to reflect light of a specified wavelength from at least one angle along a common reference beam direction.

10. The method of claim 9, wherein the multiple object beams are incident to the medium over a series of angles chosen to provide reflection efficiency over the desired angular field of view.

11. The method of claim 10, wherein the angular field of view includes angles in a single incident plane.

12. The method of claim 10, wherein the angular filed of view includes a cone of incident angles.

13. The method of claim 9, wherein the holographic recording medium is made of a photopolymerizable material.

14. The method of claim 13, wherein the holographic recording medium has a thickness of about between 50 μm and 5 mm.

* * * * *